Sept. 25, 1945.  R. HEATH  2,385,512

POWER SHOVEL AND LOADING DEVICE

Filed Dec. 26, 1944  2 Sheets-Sheet 1

INVENTOR.
ROBERT HEATH
BY Martin E. Anderson
ATTORNEY.

Sept. 25, 1945.    R. HEATH    2,385,512
POWER SHOVEL AND LOADING DEVICE
Filed Dec. 26, 1944    2 Sheets-Sheet 2

INVENTOR.
ROBERT HEATH
BY Martin E. Anderson
ATTORNEY.

Patented Sept. 25, 1945

2,385,512

UNITED STATES PATENT OFFICE 2,385,512

POWER SHOVEL AND LOADING DEVICE

Robert Heath, Fort Collins, Colo.

Application December 26, 1944, Serial No. 569,684

4 Claims. (Cl. 214—140)

This invention relates to improvements in power shovels and loaders of the type employed for handling dirt or other substances.

The invention relates, more particularly, to a hydraulically operated shovel or loader designed for attachment and use with tractors that are equipped with hydraulic pumps.

Since the gasoline tractor has become very popular, and is extensively employed on farms and in many other places, efforts have been made to utilize the power of tractor engine for accomplishing various objects besides that of pulling loads.

Among the many attachments that have been invented for use with farm tractors, there is one which is exceptionally useful and which is frequently referred to as "manure loaders," "power shovels" and perhaps under other designations.

It is the object of this invention to produce a power shovel or loader of a simple and substantial construction that can be readily attached to a tractor of standard make and in which the high pressure pump of the tractor is employed to operate a hydraulic jack mechanism that controls the shovel or loader.

One object of the invention is to produce an attachment of the type described in which the shovel or loader shall be connected with the tractor by means of a deformable parallelogram in such a manner that the inclination of the shovel relative to the surface on which the tractor is supported remains substantially constant during the operation of lowering and raising the shovel.

Another object of the invention is to produce a construction in which the hydraulic lifting mechanism shall be so connected with the tractor attachment and with the lifting arms that it will exert its maximum force when the shovel is in its lowermost position and when the greatest force is required to release the load from its supporting surface.

A still further object of the invention is to produce an attachment of the type described in which the hydraulic jack mechanism is so constructed that the oil or other liquid employed enters and leaves the cylinder through a tubular piston rod whose lower end is connected to the tractor attachment by means of a hollow pivot that, in turn, is connected with the outlet port of the pump.

A further object of this invention is to produce a load carrying device of a special construction that can be employed for raising and lowering barrels.

A still further object of the invention is to produce a device of the class described in which the cylinder of the hydraulic mechanism is carried by the lifting arms and pivotally connected with them and braced in a peculiar manner that will be hereinafter described.

The above and other objects that may become apparent as this description proceeds are attained by means of a construction and an arrangement of parts that will now be described in detail, and for this purpose reference will be had to the accompanying drawings in which the invention has been illustrated in its preferred form, and in which.

Figure 1:
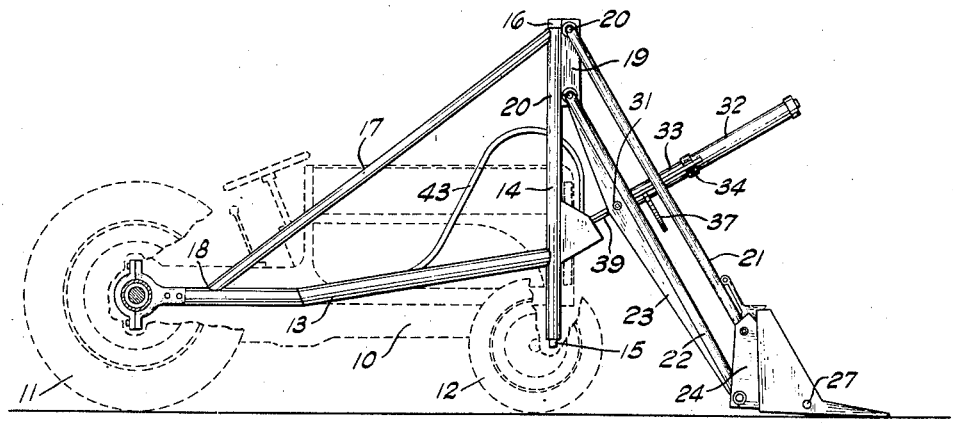
Figure 1 is a side elevation of the attachment showing the same applied to a tractor and with the shovel or load carrying device in its lowermost position.

Referring now to the drawings, reference numeral 10 designates the body or frame of an ordinary farm tractor whose rear wheels have been designated by reference numerals 11 and whose front wheels have been designated by reference numerals 12. The tractor has been indicated by dotted lines because it forms no part of the present invention which relates to the attachment which will now be described.

The attachment consists of a frame having side members 13 located on the opposite sides of the tractor. These side members have been shown as extending to the rear housing which they encircle and to which they are rotatably connected, the axial housing forming supports for the rear ends of the frame members. Secured to the front ends of the side members are vertical frame members 14 whose lower ends are connected to and supported by a transverse member 15, that, in turn, is either connected with the tractor frame or forms a part thereof. The two vertical members are connected at their upper ends by means of a transverse bar 16. Diagonal brace members 17 extend from the upper ends of the vertical members 14 to a point 18 on the side members 13 and are preferably welded to the latter. The frame work which has just been described comprises two substantially right angular triangles in which the frame members 13 form the base, the diagonal 17, the hypothenuse and the other side is formed by the vertical members 14. The exact construction of the triangle is, of course, immaterial, the important feature being the fact that stress triangles are formed which resist distorting forces most effectively. Welded to or otherwise secured to the front surface of the vertical members 14 are plates 19. These plates are provided at spaced points with openings for the reception of the shafts 20 to which the upper ends of the lifting arms 21 and 22 are connected. It will be observed from Figure 2 that the lifting arms 22 are made in the shape of trusses having flanges 23 extending downwardly from their under surfaces. The lower ends of the lifting arms 21 and 22 are pivotally connected with a structure comprising two triangular metal sheets 24 that are provided with openings for the reception of shafts or bars 25 and 26 to which the outer ends of the lifting arms are pivotally connected. The distance between the shaft 20 and between shafts 25 and 26 is preferably equal; however, it is sometimes desirable to space the shafts 25 and 26 at somewhat different distances than shafts 20, as by this means a certain tilting action of the plates 24 is obtained during the lifting operation.

A load carrying device or shovel is pivotally connected with plates 24 so as to tilt about the pivot 27. The tiltable shovel is held in operative position by a latch mechanism 28 whose operation is controlled by a handle 29 and a cable 30. The specific construction of the load carrying device or shovel and that of the latching mechanism has not been shown in detail because it is susceptible of various constructions and the one shown is merely illustrative of means.

For the purpose of raising and lowering the lifting arms with the load carrying device, a hydraulic mechanism is employed which will now be described. From Figure 1 it will be seen that the webs or flanges 23 are provided with openings for the reception of stub shafts 31. A hydraulic cylinder 32 is connected with the lifting arms 22 by means of the stub shafts and is secured to the latter by means of plates 33 that extend from opposite sides of the cylinder and which are attached to the latter by means of clamps 34.

Figure 4:
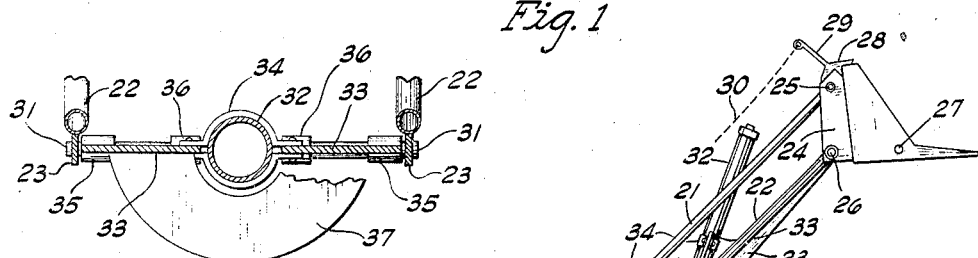
Figure 4 is a section taken on line 4—4, Figure 3.

Referring now to Figure 4, it will be seen that the stub shafts 31 extend through the flanges 23 and through cylindrical bearings 35 and 36 in the plates 33. The stub shafts terminate adjacent to the outer surface of the cylinder 32. In order to prevent transverse flexure, a gusset plate 37 has been provided and this has its ends rivetted, or otherwise secured to the plates 33. The clamps may be held frictionally in position on the cylinder or may be welded thereto. This construction positions the cylinder in such a manner that the axes of the stub shafts lie in a diametrical plane of the cylinder and this prevents the formation of forces that tend to turn the cylinder about the axes of the stub shafts and results in a construction in which the piston and the piston rod are practically freed from any lateral forces.

Positioned within the cylinder is a piston 38 to which is attached a piston rod 39. The piston rod is tubular and either extends entirely through the piston or connects with an opening that extends through the piston so that the interior of the piston rod is in communication with that part of the cylinder above the piston. Secured to the vertical frame members 14 is an angle iron support 40. The vertical flange is bolted or welded to the vertical frame members 14 and the horizontal flange extends forwardly. Secured to the upper surface of the horizontal flange are two bearings 41 in which is rotatably mounted a tubular pivot 42. The lower end of the piston rod is provided with an opening for the reception of the tubular pivot and the wall of the latter has an opening that forms a communication between the tubular pivot and the interior of the tubular piston rod. The hose 43 connects the tubular pivot with the outlet port of the high pressure pump. The pump has not been shown and will not be described in detail because it is the intention to employ the pressure pump with which the tractor is provided. Such pumps are usually provided with a safety valve that opens whenever pressure exceeds a certain amount and are also provided with valves to control the return of the oil to the oil sump.

It is now evident with the parts positioned as in Figure 1, a force tending to rotate the lifting arms upwardly is produced whenever liquid under pressure is introduced into the cylinder through the tubular piston rod. When the parts reach the position shown in Figure 2, the automatic safety valve of the pump functions and the parts are retained in this position until the manually controlled valve is operated to permit the oil to return to the oil sump. When the parts reach the position shown in Figure 2, the latch 29 is released by the operator who exerts a pull on the cable 30 for this purpose. The tilted part of the load carrying device can either be overbalanced in such a way that it will automatically return to operative position, or other means may be provided to effect this return movement.

Attention is called at this point to the fact that when the load carrying device is in its lowermost position, the lever arm on which the pressure operates, being the distance between the lowermost shaft 20 and the pivot 31, is a maximum and therefore with a given oil pressure, the turning moment is also a maximum. At this point a large amount of force is usually required to release the load, especially when the device is employed as a manure loader or for loading dirt or other material that is adhesively connected with the supporting surface. As the loading device moves upwardly, the lever arm progressively decreases, reaching a minimum when the parts arrive in a position shown in Figure 2.

Particular attention is called at this point to the specific means employed for securing the cylinder to the lifting arms and for bracing it against lateral movement and for interconnecting the lateral braces to prevent flexure.

Attention is also directed in particular to the tubular piston rod which makes the connection with the high pressure hose 43 very simple and this construction also makes it possible for the shafts 31 to descend to the lowermost portion of the piston rod, whereas, if the cylinder were positioned below and connected with the pivot 42, the point corresponding to the shafts 31 could never descend below the top of the cylinder. This reversal of the position of the cylinder and piston rod is of great importance in a design of the type here under consideration as it simplifies the construction.

Figure 5:
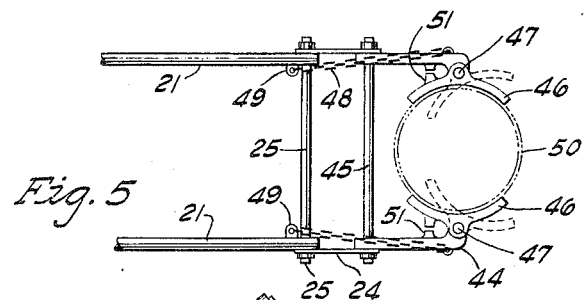
Figure 5 is a top plan view of the load carrying device shown in Figure 6.
Figure 6:
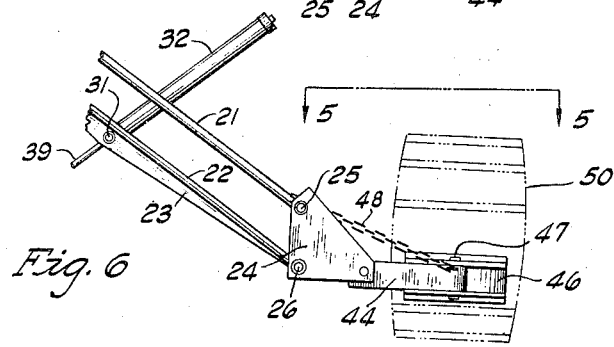
Figure 6 is a side elevation of the load carrying device shown in Figure 5.

In Figures 5 and 6 a modified form of load carrier has been illustrated which is designed for the particular purpose of lifting and stacking barrels.

Figure 2:
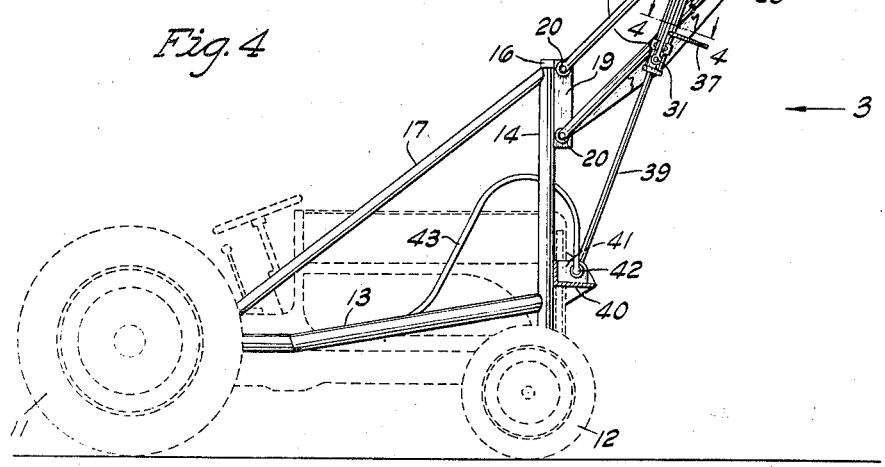
Figure 2 is a view similar to that shown in Figure 1, but shows the lifting arms and load carrying device in elevated position.
Figure 3:
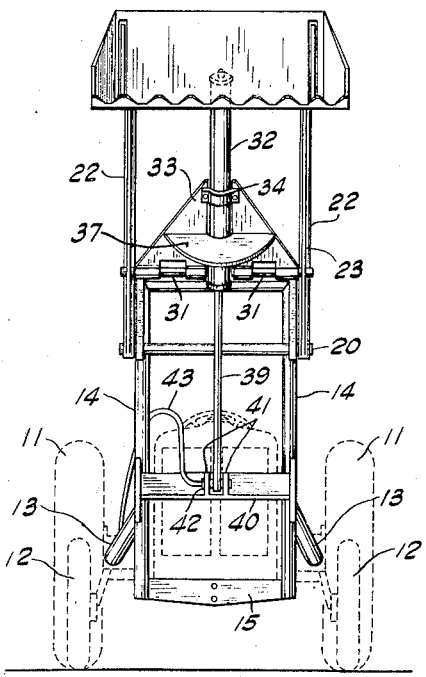
Figure 3 is a front elevation looking in the direction of arrow 3, in Figure 2.

In this embodiment, instead of the fork structure shown in Figures 1 and 2, two short channel beams 44 have been shown as connected to the side members 24 by means of a shaft or pivot 45. Pivoted to the outer ends of these channels are arcuate jaws 46 which may swing about pivots 47 from the full line to the dotted line positions shown in Figure 5. Chains 48 are connected at their upper ends to the lifting arms 21 at points 49, or they may be connected to the upper shaft 45 as may be desired. The lower ends are connected with the channels 44 near the front ends of the latter.

In the drawings a barrel has been shown and designated by reference numeral 40. When the barrel is standing on the ground, the jaws 46 are moved into dotted line position and the tractor moved forwardly so as to have the jaws embrace the barrel. As the barrel enters between the jaws, it turns them into full line positions and due to the fact that the bar increases in diameter upwardly, it will be firmly held in place by these jaws. Some means like stops 51 may be provided to limit the rearward movement of the jaws, if this should be found to be essential or desirable. After the barrel has been raised and positioned on a truck, or on top of another barrel in a storage compartment, a rearward movement of the tractor will permit the jaws to open, leaving them in the dotted line position as shown in Figure 5.

The loading device just described is found to be exceptionally well suited for handling barrels of any kind, especially ordinary vinegar barrels and barrels of that type. Where the barrels are cylindrical as gasoline and oil barrels sometimes are, they are usually provided with strengthening ribs and such ribs will engage the jaws to prevent the barrel from sliding. The chains hold the bars 41 and the jaws in proper position during operation.

In Figures 7 and 8 a modified form of construction has been shown which will now be described.

In this construction the lifting arms 21 and 22, together with the load carrying device have been removed and the cylinder 32 has been mounted for sliding movement in a sleeve 52 that is secured to the upper end of the vertical frame members 14. The piston rod is connected with the pivot 42 as in the construction already described, and therefore when oil under pressure is introduced into the upper end of the cylinder, the latter will move upwardly. The lateral braces 33 have been retained as in the other constructions and the stub shafts 31 have also been retained. Instead of having the outer ends of the stub shafts connected with the lifting arms 22, they are pivotally connected with links 53, which are moved upwardly and downwardly by the hydraulic mechanism.

Having described the invention what is claimed as new is:

1. In combination with a tractor having a frame, a rear axle, a high pressure pump and an oil sump, a frame of triangular shape on each side of the tractor, and secured thereto, the two longer sides having their vertices adjacent the rear axle, the short side extending substantially vertically adjacent the front of the tractor, each vertical arm having two spaced bearings near its upper end, lifting arms pivotally connected with the four bearings, the arms being of substantially the same length, a load carrying device having a back and two spaced sides and two pair of vertically spaced bearings, one pair adjacent each side, the lower ends of the lifting arms being pivotally connected with the last mentioned bearings; whereby two spaced, parallel, deformable parallelograms are formed, and means for rotating the lifting arms about their upper pivotal connections, comprising, an elongated cylinder pivotally connected at its lower end with the lower arms of the two pair, the upper end of the cylinder being closed, a piston in the cylinder, a tubular piston rod extending through the piston, a pivot secured to the vertical frame members below the lowermost of the upper bearings, the lower end of the piston rod being hingedly connected with the frame by said pivot, the interior of the piston rod being in communication with the interior of the cylinder, and means connecting the interior of the piston rod with the pressure pump.

2. The combination with a tractor having a frame and a high pressure pump provided with a pressure limit release, a sump and a manually operable control valve, detachable frames, one on each side of the tractor, each frame comprising, a triangular structure having its longer sides converging rearwardly and connected with the tractor frame adjacent the rear axle, the short side extending vertically adjacent the front of the tractor, means for supporting the front ends of the frame from the engine mount, means interconnecting the upper vertices of the frames to hold them in spaced parallel relation, each vertical frame member having two vertically spaced bearings adjacent its upper end, a shovel having a bottom, side and end walls, the shovel having two vertically spaced bearings at each side near the back, lifter arms connecting corresponding bearings on the shovel and on the vertical frame members, whereby two spaced, distortable parallelograms are formed, a hydraulic cylinder pivotally connected with corresponding arms of the rectangles, a piston in the cylinder, a tubular piston rod extending into the cylinder and through the piston, a pivot secured to the vertical frame members at a point below the lowermost bearings, the piston rod being hingedly connected with the frame by said pivot, the interior of the hollow piston rod being in communication with the outlet port of the pump, and means for controlling the flow of liquid from the pump to the cylinder and from the cylinder to the sump.

3. A load elevating device for attachment to a tractor having a pressure pump, comprising two triangular frames having sides of unequal length, the shortest side being positioned vertically and the longest side being on top of the intermediate side and rearwardly inclined. the frames being positioned on opposite sides of the tractor, means interconnecting the vertical sides, a lifting arm pivotally connected to each vertical side near the upper end thereof, a load carrying device pivotally connected with the free ends of the arms, a releasable latch mechanism for holding the load carrying device in operative position, a cylinder positioned between the arms and mounted for movement about a pivot positioned in the plane of the arms, and parallel with their upper pivotal axis, the free end of the piston being closed, means for bracing the cylinder so as to resist laterally directed forces, a piston in the cylinder, a tubular piston rod extending through the piston, the outer end of the piston rod having an opening in communication with the interior of the cylinder, a pivot carried by the vertical frame members, the pivot serving as means for hingedly connecting the lower end of the piston rod with the frame, and means connecting the interior of the piston rod with the pressure pump, whereby relative movement can be effected between the cylinder and the piston when a liquid under pressure is introduced into the cylinder.

4. A load lifting and dumping device for attachment to a tractor having a high pressure pump, comprising two spaced frame members secured to the front end of the tractor and extending upwardly therefrom, braces extending rearwardly from the vertical frame members, means for interconnecting the vertical frame members near their upper ends, a lifting arm on each side of the tractor pivotally connected at its rear end with the frame and projecting forwardly beyond the vertical frame members, a pivot carried by the vertical frame member, a tubular connecting rod having its lower end connected with the pivot and its interior in communication with the interior of the cylinder, a piston on the free end of the piston rod, a cylinder slidably enclosing the piston, means attached to the vertical frame members for constraining the cylinder to move in a predetermined path, and means for pivotally interconnecting the lifting arms and the cylinder whereby when the cylinder is moved relative to the piston and piston rod, a corresponding movement will be imparted to the lifting arms.

ROBERT HEATH.